United States Patent [19]

Puryear

[11] 4,359,196
[45] Nov. 16, 1982

[54] SPINNING REEL HOUSING WITH AN ACCESS OPENING AND REMOVABLE CAP THEREFOR

[75] Inventor: John W. Puryear, Tulsa, Okla.

[73] Assignee: Brunswick Corporation, Skokie, Ill.

[21] Appl. No.: 218,927

[22] Filed: Dec. 22, 1980

[51] Int. Cl.³ .............................................. A01K 89/01
[52] U.S. Cl. ................................ 242/84.2 R; 220/301
[58] Field of Search ............... 242/84.2 A, 84.2 R, 242/84.21 R, 84.21 A, 84.51 A, 84.5 A; 220/301, 293, 295, 296, 298

[56] References Cited

U.S. PATENT DOCUMENTS

| | | | |
|---|---|---|---|
| 1,070,752 | 8/1913 | Tyler | 220/301 |
| 2,613,468 | 10/1952 | Hand | 242/84.21 A |
| 3,088,691 | 5/1963 | Hull | 242/84.5 A |
| 3,223,347 | 12/1965 | Clark | 242/84.2 A |

*Primary Examiner*—Billy S. Taylor
*Attorney, Agent, or Firm*—John G. Heimovics

[57] ABSTRACT

A closed face spinning reel has a housing with an opening affording access to the reel mechanism. The opening is closed by a removable cap. The cap is seated on a radial flange in the opening and has flexible legs on its inner surface which engage cap locking surfaces on the inner face of the flange.

9 Claims, 10 Drawing Figures

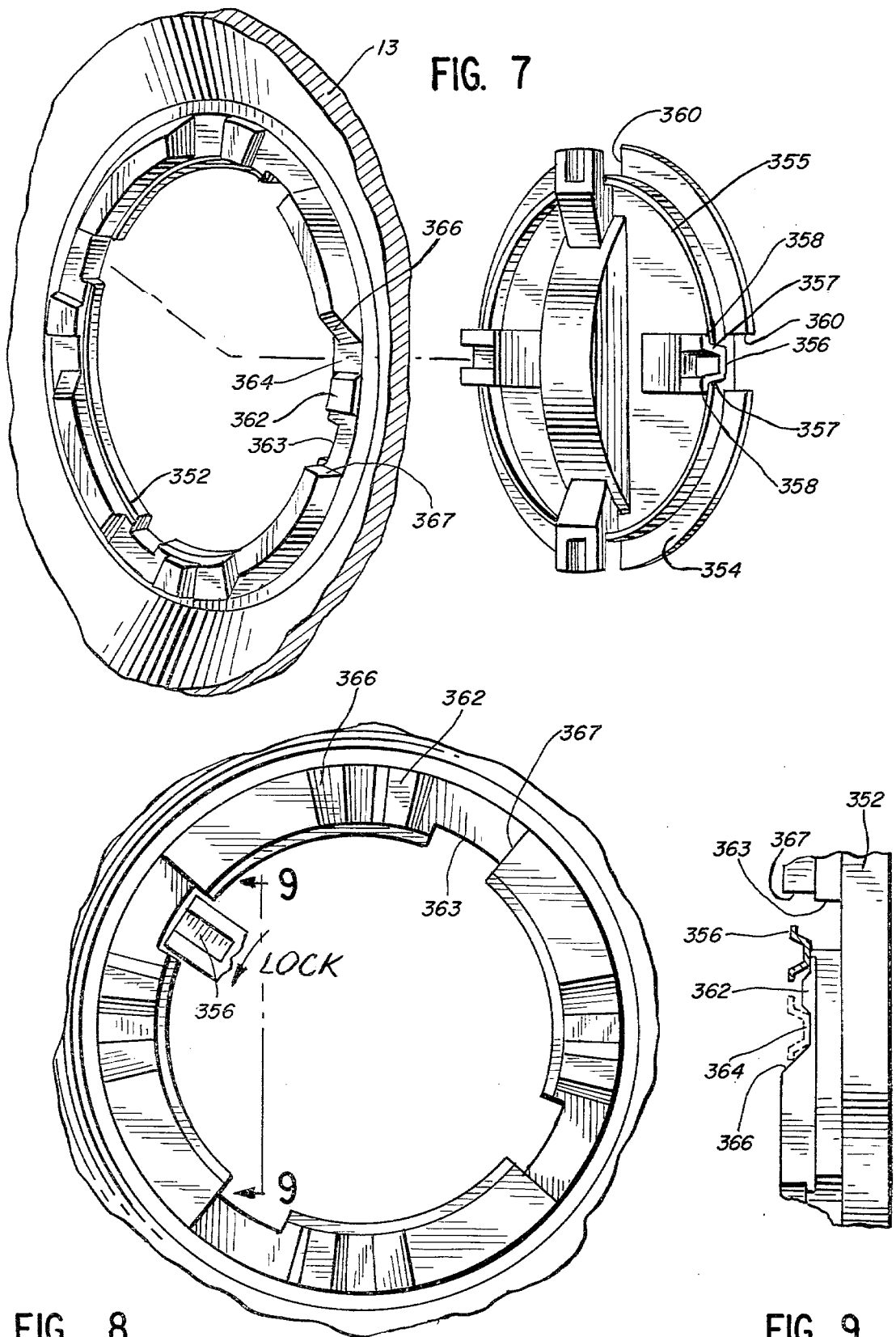

SPINNING REEL HOUSING WITH AN ACCESS OPENING AND REMOVABLE CAP THEREFOR

DESCRIPTION

1. Technical Field

This application relates to a closed face spinning reel and more particularly to the housing for the reel with an access opening and removable cap.

2. Background Art

Closed face spinning reels typically have a body on which the reel mechanism is mounted, with front and rear housing members defining an enclosure for the reel. When it is desired to have access to the mechanism, as to clean and lubricate it or to dry it if it should become wet, one must disassemble the housing. This requires at least a proper screw driver. Care must be taken not to lose parts or to damage the mechanism. The reel of this application overcomes one or more of the problems set forth above.

DISCLOSURE OF THE INVENTION

In one aspect of the invention, the reel enclosure is provided with an opening which affords access to the mechanism and with a removable cap which closes the opening.

More particularly, a center opening is provided in the real wall of the reel mechanism enclosure and has a radial flange on which the cap is seated. The cap has lugs or threads on its inner surface which engage cap locking surfaces on the inner face of the radial flange. The locking surfaces include recesses in which the lugs seat, holding the cap in place. The cap has a tool receiving recess, as a coin slot, to facilitate removal and replacement.

BRIEF DESCRIPTION OF THE DRAWINGS

FIG. 1A is a rear perspective of the gear and ratchet of the crank shaft;

FIG. 7 is an exploded perspective of the portion of the housing surrounding the opening and of the cap, taken from inside the rear wall;

FIG. 8 is an enlarged elevation of the locking surfaces on the inner face of the flange; and FIG. 9 is a fragmentary view taken along line 9—9 of FIG. 8 showing the cap lug in locked and unlocked position.

BEST MODE FOR CARRYING OUT THE INVENTION

Figure 1:
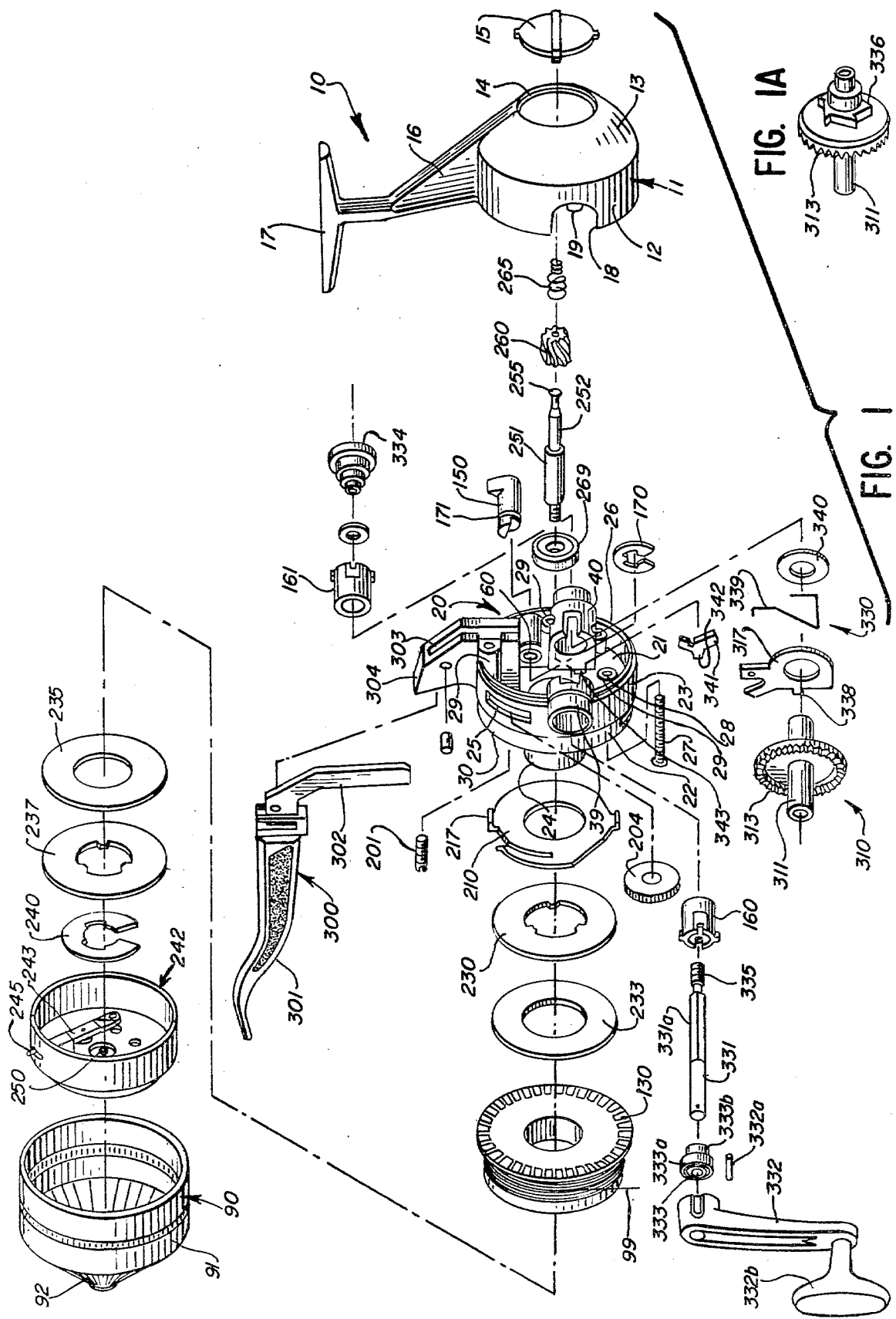
FIG. 1 is an exploded view of a reel embodying the invention.

FIG. 1 generally depicts an exploded perspective view of a fishing reel 10 of the spin casting type containing the preferred embodiment of the invention. A back support housing 11, preferably made of an aluminum alloy material, has a cylindrical cover 12, one end of which is open and the other end of which merges into a semispherical rear wall 13 having a center opening 14 in which is seated a back cap 15. A steam 16 is integrally cast with the cylindrical cover 12 and has a mounting foot 17 which is used to attach the reel 10 to a spinning style fishing rod (not shown). A body 20, made of a plastic material, such as a glass filled polycarbonate, has a transverse deck plate 21 with a first or forward circumferential body portion 22 and a second or rearward circumferential body portion 23. A central hub 24 projects forward of the deck plate 21 with a drag plate 210, back spool washer 230, back flat drag washer 233, spool assembly 130, front flat drag washer 235, front spool washer 237, all secured to the hub 24 by means of spool retainer clip 240 which fits into a groove (not shown in FIG. 1) in the distal end of hub 24. The body 20 is secured to the back support housing 11 by inserting an inset flange 26 on the rearward body portion 23 of the body 20 into the one open end of the cylindrical cover 12 of the bank support housing 11 and threading screws 27, only one of which is shown in FIG. 1, through apertures 28 in bosses 29 formed through and on the deck plate 21 and into mating bosses (not shown in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole (not shown in FIG. 1) in the hub 24 with a spinner head assembly 242 threaded by means of the threaded opening 250 on the forward threaded end of the shaft 251. The spinner head assembly 242 partially surrounds the forward flange of the spool assembly 130 with fishing line 99 being wound thereon. The cone-shaped front portion 92 of the front cover 90 has a front hole (not shown in FIG. 1) which acts as a fishing line guide as the line 99 is cast from the reel 10 and rewound after casting.

A clutch head screw 201 passes through a pilot hole or guide (not shown in FIG. 1) in the deck plate 21 with the slotted head of the screw positioned in the interior of the forward body portion 22 and with a clutch wheel 204 projecting outward of a slot 25 in the rearward body portion 23 threadingly engaging with the body of the clutch head screw 201 where the screw projects into said rearward body portion 23. A tab 217 on the drag plate 210 fits into the head of screw 201 so that when the clutch wheel 204 is revolved upward toward stem 16, the screw 201 advances forward toward the spool retainer clip 240, increasing the clamping force on the spool assembly 130 so that the ability of the spool assembly 130 to revolve relative to the hub 24 is decreased. When the clutch wheel 204 is revolved away from the stem 16, the clamping force is decreased and the spool assembly 130 is permitted to revolve more freely relative to hub 24, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 252 of the center shaft 251 and is resiliently maintained in a forward position against the deck plate 21 by a center shaft spring 265. The pinion gear 260 and center shaft 251, being splined together, will have relative axial sliding motion, but rotation of the pinion gear 260 will rotate the center shaft 251. The spring 265 bears against an abutting end 255 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an upstanding bracket 304 on the body 20 and into the second or rearward body portion 23 for operable contact with the rearward end 255 of the center shaft 251. When the exterior operating handle 301 of the finger brake lever 300 is pulled upward toward the mounting foot 17, operating leg 302 engages the end 255 of the center shaft 251. The center shaft 251 and the spinner head assembly 242 mounted thereon are pushed forward relative to the bearing 269 and the hub 24. A pickup pin mechanism 243, mounted on and within spinner head assembly 242, is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an antireverse assembly 330 which will be described in more detail hereinafter.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. A fitting 333 which slides on the crank rod 331 inwardly of the pin 332a has an outer portion 333a that slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 39, inserting the crank rod 331 in the hollow boss 40, and refastening the nut 334 on the end of the rod in the sleeve means 160. The crank handle 332 has a crank knob 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion disengages the pickup pin mechanism 243 from the forward face of the cam on the hub 24, causing the spinner head assembly 242 to move rearward as the pickup pin mechanism 243 rides up the cam to extend the pickup pin 245 outwardly beyond the spinner head assembly 242 so that the rotation of the crank handle 332 will rotate the spinner head assembly 242 to wind the fishing line 99 on the spool assembly 130.

Crank assembly 310 is coupled with an antireverse assembly 330, which comprises a ratchet 336, mounted on the crankshaft 311 against the back side of face gear 313 as shown in FIG. 1(a), an antireverse drag arm 337 having a transverse lug 338, a drag spring 339 and spacer washer 340 all mounted on the hollow crankshaft 311. An antireverse pawl 341 having a pivot tang 342 pivotably mounted in an aperture 343 in the deck plate 21 is positioned against the back of the face gear 313 between the deck plate 21 and the transverse lug 338 on the drag arm 337 for engageable and disengageable contact with the ratchet 336.

Antireverse actuator 150 is mounted in upper housing sleeve 60 that opens through the wall of the rearward body portion 23 of the body 20 and the actuator 150 is retained in the sleeve 60 by retainer clip 170 seated in slot 171 in the body of the antireverse actuator 150. The antireverse actuator 150 is in cooperative contact, as will be described hereinafter, with the antireverse drag arm 317. In one position, the actuator 150 disengages the antireverse assembly 30 permitting the crank rod 331 and the crank assembly to rotate in either the forward direction (upward toward the stem 16) or the reverse direction (downward from the stem 16 toward the back of reel 10). In the other position of the actuator 150, the crank assembly can rotate to wind the line 99 on the spool 130.

With particular reference to FIGS. 3–9, the centrally located access opening 14 has a circular lip 350 at the rearward extremity of rear wall 13. A peripheral wall 351 extends axially inwardly from lip 350 and terminates at an inwardly directed radial flange 352 on which cap 15 is seated. There are locking surfaces on the inner face of flange 352 which will be described below.

Cap 15 is preferably of a molded plastic material. The outer surface is generally planar with a chamfered peripheral edge 353. The peripheral inner surface 354 of the cap 15 seats on the outer surface of flange 352. An annular rib 355 on the inner face of the cap engages the edge of flange 352 and centers the cap in the opening.

Four locking lugs 356 are provided on the inner surface of cap 15, spaced apart 90°. Each lug 356 is spaced inwardly from the inner cap surface and extends outwardly toward the periphery of the cap. The lug 356 when viewed in elevation, see FIGS. 3, 5, 7 and 9, has a generally U-shaped configuration with the sides 357 of the U angled outwardly and terminating in lateral outwardly extending lips 358. The cap material and lug thickness are such that the lugs are flexible for interengagement with the locking surfaces on flange 352. The rim of cap 15 is interrupted in axial alignment with the locking lugs 356, as indicated at 360. This enables molding the cap with a relatively inexpensive two-part mold.

Figure 2:
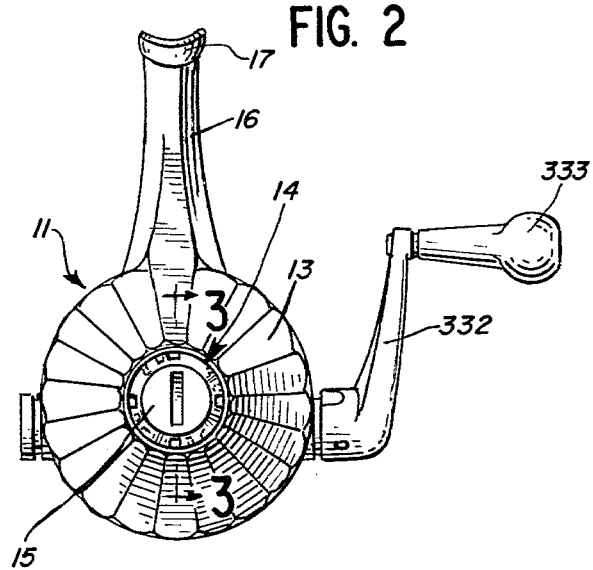
FIG. 2 is a rear view of the assembled reel with the crank on the opposite side from FIG. 1.
Figure 3:
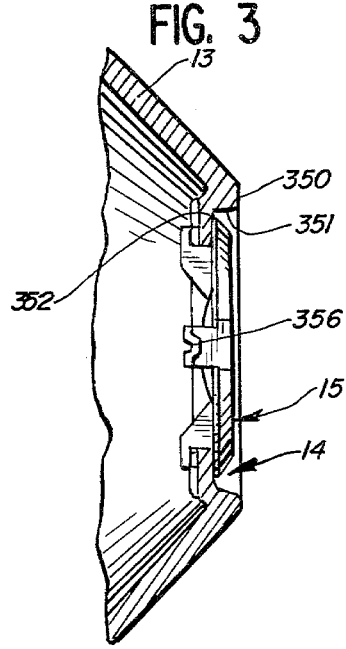
FIG. 3 is an enlarged fragmentary section taken along line 3—3 of FIG. 2.
Figure 4:
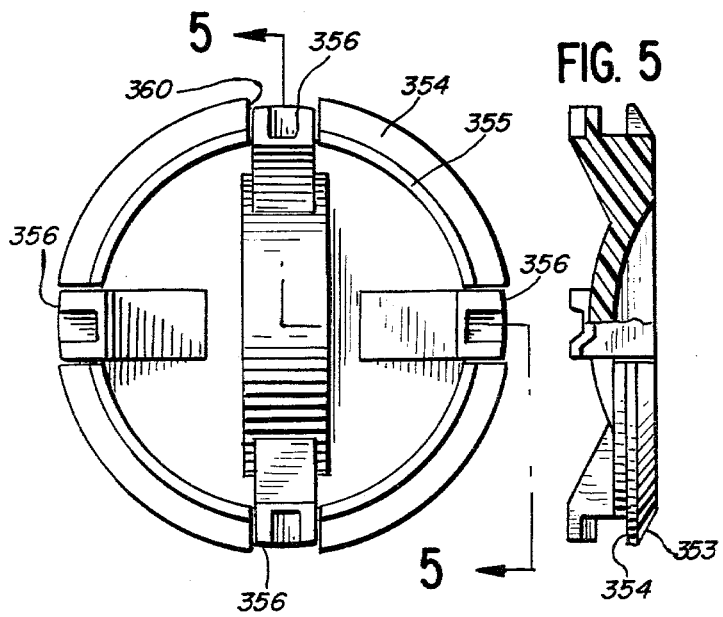
FIG. 4 is an enlarged elevation of the inner surface of the cap.
Figure 5:
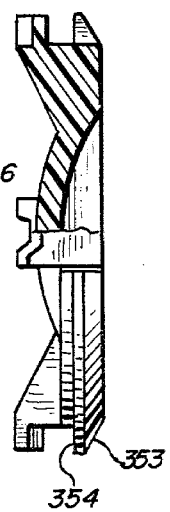
FIG. 5 is a broken section taken along line 5—5 of FIG. 4.
Figure 6:
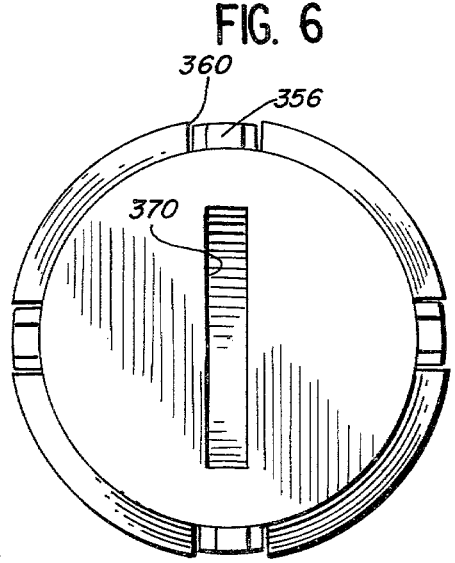
FIG. 6 is an elevation of the outer surface of the cap.

The locking surfaces on the inner face of flange 352 include, for each lug, a boss 362 which extends inwardly from the flange surface and is flanked by a slot 363 and a locking recess 364. Cap 15 is inserted in opening 14 with locking lugs 356 aligned with the slots 363. The cap is then turned clockwise as viewed in FIG. 2 forcing each resilient locking lug 356 over boss 362 and into locking recess 364. The taper of the walls of recess 364 compliments the U-shaped configuration of lug 356 so that the lug surfaces engage the recess surfaces and the cap is fixed securely in place, see FIG. 9.

The cap is removed by turning it counterclockwise to unlock the lugs 356 which then pass outwardly through slots 363. Shoulders 366 an 367, adjacent locking recess 364 and slot 363, respectively, restrict movement of cap lugs 356 beyond the slot 363 and locking recess 364. Locking and unlocking rotation is of the order of 30°.

A slot 370 in the outer surface of cap 15 receives a suitable tool, as a coin, to aid in turning the cap.

The axial dimension of cap 15 between peripheral inner surface 354 and its outer surface is less than the axial extent of wall 351 around the opening 14 so that the cap when seated on flange 352 is recessed within the opening.

I claim:

1. In a closed face spinning reel having a body, a reel mechanism supported by said body, a front cover and a back housing connected with said body and forming an enclosure for said mechanism, and a rear wall on the back housing, the improvement comprising:

an opening centrally located in the rear wall affording access to the reel mechanism;

a removable cap for the opening, the opening has an inwardly directed radial flange on which the cap is seated, with cap locking surfaces on the inner face of the flange, and the cap has an inner surface with locking lugs for engagement with the cap locking surfaces, the locking lugs are outwardly directed flexible elements, spaced inwardly from the inner surface of the cap and the cap locking surfaces include a boss and recess peripherally spaced, one boss and recess for each of the lugs, rotation of the cap moving the lugs over a boss into and out of the associated recess.

2. The reel of claim 1 in which the width of the recess compliments the width of the lug to hold the cap in a fixed locked position.

3. The reel of claim 1 having a radial slot through the flange adjacent each boss and on the side thereof remote from the recess to accommodate axial passage of a cap locking lug upon insertion and removal of the cap.

4. The reel of claim 3 in which the slots are wider than the lugs.

5. The reel of claim 1 in which the cap has at least two locking lugs and there are at least two sets of complementary locking surfaces on the inner face of the flange.

6. The reel of claim 5 in which the cap has four lugs and there are four complimentary sets of locking surfaces.

7. The reel of claim 1 having shoulders on the inner surface of the flange adjacent each boss and recess to restrict movement of the cap lugs other than movement between the locked and unlocked positions.

8. The reel of claim 1 in which the cap has means for rotation of the cap.

9. In a closed face spinning reel having a body, a reel mechanism supported by the body, a front cover and a back housing connected with the body and forming an enclosure for the mechanism, the improvement comprising:

an opening in the enclosure affording access to the reel mechanism;

a removable cap for the opening, the opening has an inwardly directed radial flange on which the cap is seated, cap locking surfaces on the inner face of the flange, and the cap has an inner surface with locking lugs for engagement with the cap locking surfaces, the opening is defined by a lip on the surface of the rear wall of the back housing, with an annular wall extending axially inwardly and having the radial flange at the inner extremity of the wall, the cap having a thickness less than the axial length of the annular wall so that the cap, when seated on the flange, is recessed inside the lip.

* * * * *